United States Patent [19]

Delloye et al.

[11] Patent Number: 4,818,504
[45] Date of Patent: Apr. 4, 1989

[54] PURIFIED, STRONTIUM-FREE BARIUM VALUES

[75] Inventors: Thierry Delloye, Villeparisis; Jean-Louis Sabot, Maisons Laffitte, both of France

[73] Assignee: Rhone-Poulenc Chimie, Courbevoie, France

[21] Appl. No.: 187,344

[22] Filed: Apr. 28, 1988

[30] Foreign Application Priority Data

Apr. 29, 1987 [FR] France .................... 87 06088

[51] Int. Cl.$^4$ .............................................. B01D 11/04
[52] U.S. Cl. ...................................... 423/157; 423/165
[58] Field of Search ................ 423/157, DIG. 14, 165

[56] References Cited

U.S. PATENT DOCUMENTS 3,637,711 1/1972 Budde et al. ................ 423/DIG. 14
3,694,369 9/1972 Orlandini ............................ 423/157

FOREIGN PATENT DOCUMENTS 1061574 9/1979 Canada ........................: 423/DIG. 14

OTHER PUBLICATIONS

Ritcey et al, "Some Aspects of the Extraction of Metal from Acidic Solutions by Kelex 100," *CIM Bulletin* (Feb. 1974), pp. 87–92.
A. W. Ashbrook, "Commercial Chelating Solvent Extraction Reagents, II, Purification and Properties of B-Alkenyl-8-Hydroxyquinoline," *Journal of Chromatography*, 105 (1975) pp. 151-156.

*Primary Examiner*—John Doll
*Assistant Examiner*—Wayne A. Langel
*Attorney, Agent, or Firm*—Burns, Doane, Swecker & Mathis

[57] ABSTRACT

Barium compounds containing contaminating amounts of strontium, e.g., barium salts, are effectively purified, notably into barium values suitable for conversion into specialty grade barium carbonate and titanate, by intimately contacting and liquid/liquid extracting aqueous solutions thereof with an organic solvent phase comprising at least one essentially water insoluble —CH$_2$—R' substituted 8-hydroxy-quinoline extractant.

27 Claims, No Drawings

PURIFIED, STRONTIUM-FREE BARIUM VALUES

BACKGROUND OF THE INVENTION

1. Field of the Invention

The present invention relates to the purification of barium salts, and, more especially, to the preparation of high purity barium salts having, in particular, low strontium contents.

The process of the present invention is well adapted, for example, for the production of a purified barium carbonate of such high degree of purity as to be suitable as a precursor of a barium titanate having the same degree of high purity.

2. Description of the Prior Art

The demand in this art for high purity barium salts is ever increasing, in view, for example, of the extensive development of ceramic capacitors based on barium titanate, or of magnetic disks based on barium hexaferrite.

However, barium minerals, whether the sulfate, such as for example in barytine, or the carbonate as in witherite, contain numerous impurities, in particular iron, calcium, sodium and strontium. Other impurities, such as chlorine or sulfur, may be introduced over the course of the conventional processes for the preparation of barium carbonate.

While most of the impurities which usually accompany barium may be eliminated with relative ease by the classical techniques of precipitation/redissolution, the elimination of the trace amounts of strontium remains a serious problem because of the great similarity in the chemical properties of the two elements.

Certain processes are known for the separation of strontium and barium values, based, for example, on chromatography or ion exchange, but these are laboratory separation processes, rather than processes capable of being carried out technically and economically on an industrial scale.

In French Patent No. 86/02,791, assigned to the assignee hereof, an industrial process is described which enables the separation of strontium and barium with a view towards the production of high purity barium salts. The process described is characterized in that an initial aqueous barium solution is intimately contacted with an organic solvent comprising at least one extractant that is essentially insoluble in water, such extractant being selected from among carboxylic acids, monoesters of phosphonic acids and 8-hydroxyquinoline, whereby, after the resulting separation of the phases, a desired final aqueous solution of purified barium values is recovered, as is an organic phase charged with unwanted impurities, in particular strontium.

In the case in which the extractant is an 8-hydroxyquinoline, the '791 patent indicates a preference for 7-(1-methyl-4-ethyloctyl)-8-hydroxyquinoline.

Although this process is capable of providing markedly good purification results as regards the elimination of strontium values, while at the same time requiring relatively few extraction stages (and thus is compatible with industrial level operations), the extent of elimination of the strontium remains inadequate for certain specialized applications.

SUMMARY OF THE INVENTION

It has now unexpectedly been found that the nature and the position of substituent radicals on an 8hydroxyquinoline has a profound effect on the extracting power of the solvent, as well as on the selectivity of extraction vis-a-vis the strontium/barium pair.

Accordingly, a major object of the present invention is the provision of an improvedly efficient process for the purification of barium compounds, notably to effectively remove contaminating amounts of strontium impurities therefrom.

Briefly, the present invention features the preparation of a highly purified barium salt, in particular having a very low strontium content, by intimately contacting and liquid/liquid extracting an initial aqueous solution of barium values with an organic solvent phase containing at least one 8-hydroxyquinoline extractant that is essentially insoluble in water, said 8-hydroxyquinoline extractant having the formula (I):

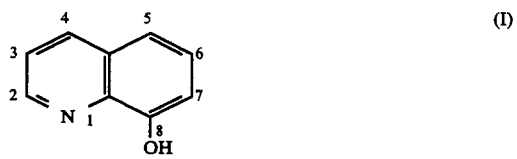

and bearing at least one substituent of the formula (II):

wherein R' is an alkyl, alkenyl, alkynyl, alicyclic or aromatic radical, and whereby, after the resulting phase separation, a final aqueous solution of purified barium values is recovered, as is an organic phase charged with the unwanted impurities, in particular strontium.

DETAILED DESCRIPTION OF THE PREFERRED EMBODIMENTS OF THE INVENTION

More particularly according to the present invention, it will be apprec.iated that the special solvent phase selectively extracts the unwanted strontium values, which implies that the amounts of solvent to be used remain limited. Furthermore, the strontium/barium separation factors are sufficiently high, such that the number of extraction stages required for a given purification is low.

Upstream of the actual carrying out of the process of the invention, a starting material is selected which is advantageously a barytine, a mineral based on barium sulfate, which is reduced to the sulfide BaS by reaction with coke. The barium sulfide is then treated in known manner to provide a barium carbonate of standard quality, i.e., having a strontium content ranging from about 1% to 5% by weight relative to the barium content (Sr/Ba).

It will of course be appreciated that any other barium/strontium starting material may also be used.

The barium carbonate obtained in this manner is then treated with an acid, in particular hydrochloric acid or nitric acid, whereby an aqueous solution of either barium chloride or barium nitrate is respectively produced. the strontium content of these solutions is as indicated above. These solutions contain additional impurities, such as, in particular, sodium, calcium, iron and possibly chlorine and sulfur, with the amounts thereof varying as a function of the origin of the raw material selected, the particular process employed, or the carrying out of upstream pre-purifications in respect of these elements.

These solutions, in particular of barium chloride or barium nitrate, are well suited for the selective extraction of the invention. However, any other solution of soluble barium salts may also be used.

Thus, it has been found to be particularly advantageous to use solutions of hydrated barium hydroxide. In effect, on the one hand these solutions are produced by simply dissolving the solid hydroxide in water, whereby the decomposition of barium carbonate by means of an acid is avoided, and, on the other, these solutions are such that optimal pH conditions, such as those described below, are automatically attained.

The degree of hydration of the hydroxide may vary and characteristically is equal to 1.3 or 8.

In a preferred embodiment of the invention, a solution of barium hydroxide octahydrate of the formula $Ba(OH)_2 \cdot 8H_2O$ is used.

The initial aqueous solution of barium values to be purified is then intimately contacted with an organic solvent phase comprising at least one of the substituted 8-hydroxyquinoline extractants described above.

Consistent herewith, by definition the at least one substituent having the formula $-CH_2-R'$ comprises at least one methylene group, or bridge. It may comprise several such groups.

Certainly, however, the extractant may contain other substituent radicals which do not have the $-CH_2-R'$ formula.

In the latter case, such radicals, which may be identical or different, are typically alkyl, alkenyl, alicyclic and/or aromatic radicals. However, in this case also it is preferable to use extractants bearing alkyl substituents.

It has been determined that best results are obtained when at least one radical of the formula $-CH_2-R'$ is in the 5- or 7-position.

In another preferred embodiment of the invention, an extractant having but a single radical of the formula $-CH_2-R'$ is used, which single substituent is preferably in the 5- or 7-position, and more preferably in the 7-position. In the latter case, it is preferable that the extractant bear no other substituents. This remains true if the single substituent having the formula $-CH_2-R'$ is in the 5-position.

Stated differently, 8-hydroxyquinolines monosubstituted in the 5- or 7-positions, and preferably monosubstituted in the 7-position by radicals of the formula $-CH_2-R'$ are especially well adapted for the process according to the invention.

It has also been found that it is particularly advantageous to use such an extractant in which the R' radical defined above is a linear or branched chain alkyl or alkenyl radical. Preferably, the R' radical then contains from 4 to 24 carbon atoms and, even more preferably, from 7 to 14 carbon atoms.

Thus, exemplary 8-hydroxyquinolines monosubstituted in the 7-position by methylene-alkyl or methylene-alkenyl radicals are the 7-(n-alkylhexyl)-8-hydroxyquinolines (n being an integer ranging from 2 to 5) and more particularly 7-(2-ethylhexyl)-8-quinoline, as well as 7-dodecenyl-8-hydroxyquinoline.

In certain cases it proves advantageous to use an organic phase containing at least one substituted 8-hydroxyquinoline extractant as described above, in solution in a diluent compatible therewith.

Indeed, due in particular to their physical properties, certain extractants cannot be used in the pure state for the liquid/liquid extraction of the initial aqueous phase. In such a case, the diluent, in addition to its solubilizing activity, exerts a favorable influence on the physical properties of the extractant or extractants, for example, by reducing the viscosity or the density of the organic phase.

Exemplary such diluents, whether singly or in admixture, are compounds such as saturated or unsaturated aromatic or aliphatic hydrocarbons. Kerosene is especially suitable.

The diluent/extractant proportions are not critical. The concentration of the extractant or extractants in the diluent may range from approximately 2% to 60% by weight relative to the total weight of the solvent. This concentration is a function, in particular, of the physical properties of the initial organic phase to be provided.

A modifying agent may also be added to the organic solvent to prevent problems of separation that may arise when utilizing an acid medium.

It is thus possible to use sufficiently long chain alcohols as to be insoluble in water, for example decanol. The proportions of the modifying agent may range from 2% to 80% by weight relative to the total weight of the solvent, preferably from 5% to 15%.

The liquid/liquid extracting of the initial aqueous phase loaded with barium with the organic solvent is carried out in known manner in an apparatus of the mixer-decanter or column type, for example.

Advantageously, the extraction is carried out continuously. It may be carried out cocurrently or, preferably, countercurrently. It is possible to use one or several stages.

In this respect, it is important to note that by judiciously selecting a sufficient number of stages, it is possible to attain a degree of purification relative to strontium as high as is possible, i.e., residual amounts of strontium on the order of a few ppm relative to the barium.

The temperature at which the liquid/liquid extraction is conducted is not critical. In actual practice, this temperature advantageously ranges from ambient temperature to 70° C.

The ratios of the phases by volume will be determined in conventional manner within the conventional limits of liquid/liquid extraction.

Also, it may be advantageous for a more satisfactory execution of the process according to the invention to introduce a base into the medium of extraction, such as to establish certain desirable pH conditions in the equilibrium medium. Thus, it is advantageous to operate at pH values higher than 10 and more particularly at a pH ranging from 11 to 13. Such pH values for these extractants favor the barium/strontium separation.

To adjust the pH to these values, any suitable base may be used during the intimate contacting of the aqueous and organic phases. However, in the case of high pH values, in particular higher than 12, sodium hydroxide may advantageously be used.

In another preferred embodiment of the invention, the conditions of basicity are provided by the addition of a barite of the formula $Ba(OH)_2 \cdot 8H_2O$, to avoid the introduction of extraneous impurities, in particular sodium. For the same purpose, another preferred embodiment of the invention entails the use of ammonia.

After the liquid/liquid extraction and the resulting separation of the two phases, an aqueous solution essentially devoid of strontium values is produced, constituting the desired final product, as is an organic phase charged with the unwanted impurities.

The aforementioned organic phase may then be subjected to an acid wash, in particular using nitric acid, in order to recover any small amount of barium extracted during the extraction stage, followed by regeneration by back-extraction with an aqueous acid solution, in particular nitric or hydrochloric acid (by methods similar to those described during the first extraction stage), whereby, after the resulting separation of the phases, an aqueous phase loaded in particular with strontium values and a final purified organic phase are provided.

In yet another preferred embodiment of the invention, said final organic phase may be reused and recycled to the extraction of the impurities contained in the initial aqueous solution. The process of the invention may thus be carried out in a closed loop.

The final product aqueous solution may optionally be subjected to a supplemental purification treatment, essentially to eliminate any sodium values. In the case of a barium nitrate solution, this treatment entails the crystallization of the barium salt by evaporation of the solution, or by adding to said solution of barium nitrate a solution of ammonium hydrogenocarbonate, whereby a high purity barium carbonate precipitate is formed.

The same carbonation treatment may also be applied to solutions of barium chloride or barite, again providing high purity barium carbonates.

Such nitrate or carbonate is useful in numerous applications, in particular as a precursor in the production of high purity barium titanate.

In order to further illustrate the present invention and the advantages thereof, the following specific examples are given, it being understood that same are intended only as illustrative and in nowise limitative.

Common operating conditions:

A barite solution was produced by dissolving, at 20° C., 60 kg of barium hydroxide octahydrate in 1000 ml water, and containing 1.92% by weight of strontium relative to barium (Sr/Ba).

This solution was continuously fed into a battery of mixer-decanters containing eight theoretical extraction stages.

The extraction solvent, comprising the extractant diluted in a proportion of 0.22 M/1 in kerosene, was circulated countercurrently to the barite solution.

In all cases, it was decided to limit the extraction losses in barite to 20% by weight. This was effected by suitably adjusting the ratio of the feedstreams of barite and solvent.

The following Table reports the purity, relative to strontium, of the final barite solution after eight stages of extraction, expressed by weight with respect to barium, for the following three examples:

COMPARATIVE EXAMPLE 1

The extractant was of the type described in French Patent No. 86/02,791. Therefore, it was not an extractant according to the present invention.

It was 7-(1-methyl-4-ethyloctyl)-8-hydroxyquinoline, marketed under the trademark KELEX 100 (registered trademark of the Shering Co.).

EXAMPLE 2

The extractant was 7-(2-ethylhexyl)-8-hydroxyquinoline ($R' = C_7H_{15}$, devoid of unsaturation), marketed under the trademark KELEX 108 (registered trademark of the Shering Co.). This particular compound is indeed an extractant according to the invention.

EXAMPLE 3

The extractant was 7-dodecenyl-8-hydroxyquinoline ($R' = C_{11}H_{21}$, thus monounsaturated), marketed under the trademark LIX 26 (trademark of the Henkel Co.). This particular compound is also an extractant according to the invention.

TABLE

| EXAMPLE | SOLVENT FLOW RATE BARITE FLOW RATE | Sr CONTENT |
|---|---|---|
| 1 | 1.11 | 180 ppm |
| 2 | 0.49 | 25 ppm |
| 3 | 0.59 | 6 ppm |

These results demonstrate well the spectacularly improved efficiency of the extractants of the invention. Indeed, even utilizing solvent/barite flow rate ratios reduced by 2 relative to that of Comparative Example 1, in Examples 2 and 3, final purities relative to strontium, respectively reduced by 2 and by 30, are surprisingly obtained.

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. A process for the purification of barium values contained in an aqueous solution thereof containing contaminating amounts of strontium, comprising intimately contacting and liquid/liquid extracting such initial aqueous solution with an organic solvent phase which comprises at least one essentially water insoluble 8-hydroxyquinoline extractant having the formula (I):

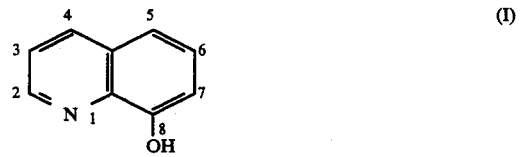

said extractant bearing at least one substituent of the formula (II):

—CH$_2$—R'     (II)

wherein R' is an alkyl, alkenyl, alkynyl, alicyclic or aromatic radical, whereby a phase separation thus results, and recovering a final aqueous phase comprising the purified barium values.

2. The process as defined by claim 1, also comprising recovering an organic phase charged with contaminating strontium values.

3. The process as defined by claim 1, said substituted 8-hydroxyquinoline extractant also bearing at least one alkyl, alkenyl, alkynyl, alicyclic or aromatic substituent not having the formula (II).

4. The process as defined by claim 3, said at least one substituent not having the formula (II) being an alkyl radical.

5. The process as defined by claim 1, wherein said at least one substituent having the formula (II), R' is a linear or branched chain alkyl or alkenyl radical.

6. The process as defined by claim 1, wherein said at least one substituent having the formula (II), R' has from 4 to 24 carbon atoms.

7. The process as defined by claim 1, wherein said at least one substituent having the formula (II), R' has from 7 to 14 carbon atoms.

8. The process as defined by claim 1, wherein said at least one substituent having the formula (II) is in the 5- or 7-position.

9. The process as defined by claim 8, wherein said at least one substituent having the formula (II) is in the 7-position.

10. The process as defined by claim 8, wherein said at least one extractant is a 7-(n-alkylhexyl)-8-hydroxyquinoline, with N ranging from 2 to 5.

11. The process as defined by claim 10, wherein said at least one extractant is 7-(2-ethylhexyl)-8-hydroxyquinoline.

12. The process as defined by claim 10, wherein said at least one extractant is 7-dodecyl-8-hydroxyquinoline.

13. The process as defined by claim 1, said organic solvent phase comprising at least one diluent.

14. The process as defined by claim 13, said at least one diluent comprising a saturated or unsaturated aliphatic hydrocarbon or an aromatic hydrocarbon.

15. The process as defined by claim 14, said at least one diluent comprising kerosene.

16. The process as defined by claim 1, said organic solvent phase comprising an essentially water insoluble long chain alcohol.

17. The process as defined by claim 1, the medium of extraction having a pH of at least 10.

18. The process as defined by claim 17, said pH having been adjusted by addition of barite, ammonia or sodium hydroxide to the medium of extraction.

19. The process as defined by claim 1, carried out continuously and countercurrently.

20. The process as defined by claim 2, further comprising back-extracting said organic phase with an aqueous acid solution, whereby a second phase separation thus results, and recovering a final purified organic phase and an aqueous phase charged with strontium values.

21. The process as defined by claim 20, further comprising recycling said purified organic phase.

22. The process as defined by claim 1, said initial aqueous phase comprising a solution of barium nitrate.

23. The process as defined by claim 22, further comprising crystallizing barium nitrate from the final aqueous phase.

24. The process as defined by claim 1, said initial aqueous phase comprising a solution of barium chloride.

25. The process as defined by claim 1, said initial aqueous phase comprising a solution of hydrated barium hydroxide.

26. The process as defined by claim 25, said hydrated barium hydroxide comprising barium hydroxide octahydrate.

27. The process as defined by claim 1, further comprising adding ammonium hydrogenocarbonate to said final aqueous phase and recovering a precipitate of barium carbonate therefrom.

* * * * *